United States Patent [19]
Watanabe et al.

[11] Patent Number: 4,929,417
[45] Date of Patent: May 29, 1990

[54] METHOD OF MANUFACTURE METAL DIBORIDE CERAMICS

[75] Inventors: Tadahiko Watanabe; Kazuhisa Shobu, both of Tosu; Yukio Kai, Ohmuta; Hideki Yamamoto, Ohmuta; Eiichi Sudoh, Ohmuta; Osamu Yagishita, Ohmuta; Junshiro Hayakawa, Higashinihonbashi, all of Japan

[73] Assignee: Agency of Industrial Science and Technology, Tokyo, Japan

[21] Appl. No.: 341,461

[22] Filed: Apr. 21, 1989

[51] Int. Cl.$^5$ ................................................. B22F 1/00
[52] U.S. Cl. ........................................ 419/12; 75/244; 264/60; 264/65; 264/125; 419/13; 419/23; 419/57; 501/96
[58] Field of Search ............... 501/96; 75/244; 419/12, 419/23, 13, 57; 264/60, 65, 125

[56] References Cited

U.S. PATENT DOCUMENTS 3,937,619  2/1976  Clougherty ........................ 419/12
4,673,550  6/1987  Dallaire et al. ..................... 419/12

Primary Examiner—Stephen J. Lechert, Jr.
Attorney, Agent, or Firm—Jordan and Hamburg

[57] ABSTRACT

A powder of at least one of $TiB_2$, $ZrB_2$ and $HfB_2$ is mixed with at least one of Ti, Zr, Hf, TiB, ZrB and HfB, or with at least one of Ti, Zr, Hf, TiB, ZrB and HfB and a powder of boron, to prepare a mixed powder which can form a sintered product having a boron content of 65 to 67 atom %. Alternatively, a powder of at least one of Ti, Zr, Hf, TiB, ZrB and HfB is mixed with a powder of boron to prepare the mixed powder. The mixed powder may further contain up to a maximum of 30% by weight of a powder of AlN. Then, the mixed powder is sintered to make metal diboride ceramics. The lower-melting metal or compound which the mixed powder contains melts to form a liquid phase and enables the manufacture of a sintered product of high density by a customary sintering operation employing a low temperature. The sintered product having a boron content of 65 to 67 atom % consists solely of metal diboride crystals having a structure of the hexagonal system.

9 Claims, No Drawings

METHOD OF MANUFACTURE METAL DIBORIDE CERAMICS

BACKGROUND OF THE INVENTION

This invention relates to a method of manufacturing metal diboride ceramics.

Metal diborides, particularly $TiB_2$, $ZrB_2$ and $HfB_2$, are used for a wide range of applications because of certain properties that they have. For example, they have a high degree of resistance to corrosion by a molten metal and are, therefore, used for making a container for holding a molten metal, or sensor members which are brought into contact with a molten metal. They are also an electrical conductor and are, therefore, used for making electrodes for a molten metal.

The majority of these metal diborides, however, have a melting point which is as high as about 3000° C., and are difficult to sinter. In order to make a sintered product of high density, Japanese Patent Publication No. 43966/1979 proposes a sintering method employing a pressure which is as high as 1000 atm., and Japanese Patent Publication No. 3997/1983 proposes the addition of a substance having a low melting point. However, the method employing such a high pressure is difficult to adopt for making a large product, since an appropriately large apparatus is still difficult to construct and operate safely. The addition of a different substance having a low melting point results in the formation of a sintered product which differs in composition from what is intended, and which no longer retains the excellent properties of a metal diboride. It makes it difficult to obtain a sintered product which is satisfactory in both mechanical properties and electrical conductivity. Moreover, the low-melting substance which retains its original form in a sintered product lowers its resistance to corrosion by a molten metal, as its corrosion is likely to start where the molten metal contacts any such substance.

SUMMARY OF THE INVENTION

Under these circumstances, it is an object of this invention to provide a method which can manufacture a sintered metal diboride ceramic product of high density which is excellent in mechanical properties, corrosion resistance and electrical conductivity, by employing a low sintering temperature and without adding any substance that may have any adverse effect on its properties.

This object is attained by a method which comprises mixing a powder of at least one of $TiB_2$, $ZrB_2$ and $HfB_2$ and a powder of at least one of Ti, Zr, Hf, ZrB and HfB to prepare a mixed powder which can form a sintered product containing 65 to 67 atom % of boron atoms, and sintering the mixed powder.

The mixed powder may further contain up to a maximum of 30% by weight of a powder of AlN.

DETAILED DESCRIPTION OF THE INVENTION

It has been found by the inventors of this invention that a metal diboride has a crystal structure of the hexagonal system if it has a boron content of 65 to 67 atom %, and that even if its boron content may somewhat deviate from the stoichiometric value, it maintains its crystal structure of the hexagonal system and does not lose its corrosion resistance or electrical conductivity, if its boron content stays within the range which has been stated.

According to this invention, therefore, a powder of at least one of $TiB_2$, $ZrB_2$ and $HfB_2$, which are all difficult to sinter alone at a low temperature, is mixed with a powder of at least one of Ti, Zr, Hf, ZrB and HfB, which are each a metal or compound having a lower melting point, to form a mixed powder having a boron content of 65 to 67 atom %. A powder of boron may also be added if required to achieve a boron content of 65 to 67 atom %. Alternatively, a powder of at least one of Ti, Zr, Hf, TiB, ZrB and HfB is mixed with a powder of boron to form a mixed powder having a boron content of 65 to 67 atom %. A powder of AlN may further be added to any such mixed powder to the extent that the mixed powder contains up to a maximum of 30% by weight of the AlN powder. Then, the mixed powder is sintered. The lower-melting metal or alloy melts to form a liquid phase and facilitates the sintering of the mixed powder even at a low temperature to yield a sintered product of metal diboride having a crystal structure of the hexagonal system.

The method of this invention is preferably carried out in the presence of a non-oxidizing atmosphere, so that the powder to be sintered may not be oxidized. For the purpose of this invention, it is also preferable to use a powder having as fine a particle size as is practically possible. A powder having an average particle diameter not exceeding four microns is preferred, and an average particle diameter not exceeding one micron is particularly preferable.

The boron content of the mixed powder is critical. If it deviates from the range of 65 to 67 atom %, it is impossible to obtain a sintered product in which all of the metal diboride crystals have a structure of the hexagonal system. If it exceeds 67 atom %, it is difficult to obtain a sintered product of high density and good mechanical properties. If it is lower than 65 atom %, it is only possible to obtain a sintered product of low corrosion and oxidation resistance due to the remaining metal, or boride which has not grown into a diboride.

The addition of AlN is effective for obtaining a sintered product of improved mechanical properties. If any AlN powder is added, it is appropriate to add up to a maximum of 30% by weight thereof. The addition of 15% by weight thereof can be expected to give the best results.

The mixed powder is placed in a mold and is cold pressed at a pressure of, say, 0.5 to 10 tons/cm². Then, a hydrostatic pressure of, say, 0.5 to 10 tons/cm² is applied to the pressed powder in a rubber press to make a compacted body having a uniform pressure distribution. Alternatively, the mixed powder is formed into a slurry in a ball mill, or the like, and a differential or elevated pressure is employed to form it into a compacted body. The compacted body is sintered at a temperature of 1800° C. to 2000° C. for a period of 30 to 200 minutes in a vacuum or argon gas atmosphere.

Alternatively, it is also possible to employ a hot pressing or hot hydrostatic method. In either event, it is easy to obtain a sintered product of satisfactorily high density.

As is obvious from the foregoing description, the method of this invention makes it possible to obtain a sintered product of high density at a lower temperature than that which has hitherto been employed for sintering metal diborides, since the lower-melting metal or compound which the mixed powder contains melts to form a liquid phase. The sintering operation itself can be carried out in a customary way, except that a lower temperature is employed. When the mixed powder having a boron content of 65 to 67 atom % has been sintered, all of the lower-melting metal or compound forms a metal diboride having a crystal structure of the hexagonal system without remaining as it is in a sintered product. The sintered product of this invention is, therefore, of high mechanical properties, corrosion and heat resistance, and electrical conductivity. The addition of AlN up to a maximum of 30% by weight of the mixed powder makes the method of this invention still more beneficial.

The invention will now be described more specifically with reference to several examples thereof.

EXAMPLE 1

A mixed powder was prepared by mixing fully 92% by weight of a powder of $TiB_2$, 5% by weight of a powder of $ZrB_2$ and 3% by weight of a powder of Zr. The mixed powder was molded at a pressure of 2 tons/cm$^2$ and was, then, pressed in a rubber press at a pressure of 4 tons/cm$^2$ to form a compacted body. The compacted body was heated at a temperature of 1950° C. for 90 minutes in a vacuum to yield a sintered product. It had a very low porosity and a flexural strength of 65 kg/mm$^2$. After its surface layer had been removed by grinding, it was examined for corrosion resistance by 24 hours of immersion in molten aluminum having a temperature of 750° C. It did not show any change in either shape or mass, but was found to be of high corrosion resistance.

EXAMPLE 2

A mixed powder was prepared by mixing fully 87% by weight of a powder of $TiB_2$, 5% by weight of a powder of $ZrB_2$, 3% by weight of a powder of Zr and 15% by weight of a powder of AlN. The mixed powder was molded at a pressure of 2 tons/cm$^2$ and was, then, pressed in a rubber press at a pressure of 4 tons/cm$^2$ to form a compacted body. The compacted body was heated at a temperature of 1650° C. for 60 minutes in a vacuum to yield a sintered product. The product had a porosity of virtually zero and a flexural strength of 65 kg/mm$^2$.

EXAMPLE 3

A mixed powder was prepared by mixing fully 82% by weight of a powder of $TiB_2$, 3% by weight of a powder of Ti and 15% by weight of a powder of AlN. The procedures of EXAMPLE 2 were followed to form a compacted body. It was heated at a temperature of 1600° C. for 60 minutes in a vacuum. There was obtained a sintered product of very good quality having a porosity of zero and a flexural strength of 85 kg/cm$^2$.

EXAMPLE 4

A wide range of sintered products were manufactured from mixed powders of different compositions in accordance with the same procedures and conditions as those employed in EXAMPLES 1 to 3. These products and their properties are shown in TABLE 1 below, in which the product of EXAMPLE 1 is also shown as No. 1. The product shown as No. 40 in TABLE 1 was made for the sake of comparison. TABLE 1 confirms that the method of this invention can manufacture at relatively low temperatures sintered products which have a very low porosity and are excellent in mechanical properties and corrosion resistance.

TABLE 1

| No. | Compositions (wt. %) | Sintering Temp. × Time (°C.) (min) | Atmosphere | Porosity (vol %) | Deflection strength (kg/mm$^2$) | Corrosion resistance to Al 750° C. × 24 h Condition after immersion |
|---|---|---|---|---|---|---|
| 1 | 1.6 Zr-rest HfB$_2$ | 2400 × 90 | Argon | 5 | 25 | Shape and mass are not shown any changes. |
| 2 | 1.6 Zr-rest HfB$_2$ | 2300 × 90 | Argon | 30 | | |
| 3 | 1.6 Zr-rest HfB$_2$ | 1950 × 90 | vacuum | 5 | 25 | |
| 4 | 3 Zr-rest HfB$_2$ | 2400 × 90 | Argon | 10 | 25 | |
| 5 | 100 ZrB$_2$ | 1800 × 90 | vacuum | 30 | 20 | |
| 6 | 0.5 Zr-rest ZrB$_2$ | 1800 × 90 | vacuum | 10 | 45 | |
| 7 | 1 Zr-rest ZrB$_2$ | 1800 × 90 | vacuum | 10 | 40 | |
| 8 | 6 Zr-rest ZrB$_2$ | 1800 × 90 | vacuum | 10 | 40 | |
| 9 | 10 Zr-rest ZrB$_2$ | 1800 × 90 | vacuum | 8 | 50 | |
| 10 | 5 HfB$_2$-5 Hf-rest ZrB$_2$ | 2400 × 90 | Argon | 10 | 20 | |
| 11 | 5 HfB$_2$-5 Hf-rest ZrB$_2$ | 2300 × 90 | Argon | 15 | 25 | |
| 12 | 5 HfB$_2$-5 Hf-rest ZrB$_2$ | 2200 × 90 | Argon | 18 | 18 | |
| 13 | 5 HfB$_2$-5 Zr-rest ZrB$_2$ | 2400 × 90 | Argon | 2 | 25 | Shape and mass are not shown any changes. |
| 14 | 5 HfB$_2$-3 Zr-rest ZrB$_2$ | 2300 × 90 | Argon | 3 | 20 | |
| 15 | 5 HfB$_2$-0.1 B-rest ZrB$_2$ | 2400 × 90 | Argon | 2 | 25 | |
| 16 | 5 Zr-rest ZrB$_2$ | 2400 × 90 | Argon | 3 | 30 | Shape and mass are not shown any changes. |
| 17 | 5 Zr-rest ZrB$_2$ | 2300 × 90 | Argon | 10 | 30 | |
| 18 | 5 Zr-rest ZrB$_2$ | 2200 × 90 | Argon | 20 | 25 | |
| 19 | 3 Zr-rest ZrB$_2$ | 1600 × 90 | vacuum | 10 | 20 | |
| 20 | 3 Zr-rest ZrB$_2$ | 1700 × 90 | vacuum | 5 | 65 | |
| 21 | 3 Zr-rest ZrB$_2$ | 1800 × 90 | vacuum | 10 | 40 | |
| 22 | 3 Zr-rest TiB$_2$ | 1700 × 90 | vacuum | 8 | 45 | |
| 23 | 3 Zr-rest TiB$_2$ | 1800 × 90 | vacuum | 6 | 48 | |
| 24 | 3 Zr-rest TiB$_2$ | 1950 × 90 | vacuum | 1 | 65 | Shape and mass are not shown any changes. |
| 25 | 5 ZrB$_2$-3 Zr-rest TiB$_2$ | 1700 × 90 | vacuum | 7 | 43 | |
| 26 | 5 ZrB$_2$-3 Zr-rest TiB$_2$ | 1800 × 90 | vacuum | 4 | 45 | |
| 27 | 5 ZrB$_2$-3 Zr-rest TiB$_2$ | 1950 × 90 | vacuum | 1.5 | 65 | Shape and mass are not shown any changes. |
| 28 | 3 Ti-rest TiB$_2$ | 1950 × 90 | vacuum | 2 | 50 | |
| 29 | 3 ZrB$_2$-0.5 B-rest TiB$_2$ | 1950 × 90 | vacuum | 1.5 | 65 | |

TABLE 1-continued

| No. | Compositions (wt. %) | Sintering Temp. × Time (°C.) (min) | Atmosphere | Porosity (vol %) | Deflection strength (kg/mm$^2$) | Corrosion resistance to Al 750° C. × 24 h Condition after immersion |
|---|---|---|---|---|---|---|
| 30 | 100 TiB$_2$ | 1950 × 90 | vacuum | 20 | 30 | |
| 31 | 1 Zr-rest TiB$_2$ | 1950 × 90 | vacuum | 1 | 65 | |
| 32 | 6 Zr-rest TiB$_2$ | 1950 × 90 | vacuum | 1 | 80 | |
| 33 | 10 Zr-rest TiB$_2$ | 1950 × 90 | vacuum | | 50 | |
| 34 | 3 CoB-rest TiB$_2$ | 1700 × 90 | vacuum | 1 | 90 | piting |

What is claimed is:

1. A method of manufacturing metal diboride ceramics comprising:
    mixing a powder of at least one of TiB$_2$, ZrB$_2$ and HfB$_2$, a powder of at least one of Ti, Zr, Hf, TiB, ZrB and HfB and a powder of boron to prepare a mixed powder which can form a sintered product having a boron content of 65 to 67 atom %; and
    sintering said mixed powder.

2. A method of manufacturing metal diboride ceramics comprising:
    mixing a powder of at least one of Ti, Zr, Hf, TiB, ZrB and HfB, a powder of boron and a powder of AlN to prepare a mixed powder which can form a sintered product having a boron content of 65 to 67 atom % and an AlN content up to 2 maximum of 30 weight %; and
    sintering said mixed powder.

3. A method as set forth in claim 1, wherein a powder of AlN is further added to prepare said mixed powder so that said mixed powder may contain up to a maximum of 30% by weight of said powder of AlN.

4. A method as set forth in claim 3, wherein said sintering comprises heating said mixed powder at a temperature of 1800° C. to 2000° C. for a period of 30 to 200 minutes in a non-oxidizing atmosphere.

5. A method as set forth in claim 4, wherein said mixed powder has an average particle diameter up to a maximum of four microns.

6. A method as set forth in claim 5, wherein said average particle diameter is up to a maximum of one micron.

7. A method as set forth in claim 1, wherein said sintering comprises heating said mixed powder at a temperature of 1800° C. to 2000° C. for a period of 30 to 200 minutes in a non-oxidizing atmosphere.

8. A method according to claim 7, wherein said mixed powder has an average particle diameter up to a maximum of four microns.

9. A method as set forth in claim 8, wherein said average particle diameter is up to a maximum of one micron.

* * * * *